United States Patent [19]

McCleer et al.

[11] Patent Number: 5,387,854

[45] Date of Patent: Feb. 7, 1995

[54] METHOD OF TORQUE NOTCH MINIMIZATION FOR QUASI SQUARE WAVE BACK EMF PERMANENT MAGNET SYNCHRONOUS MACHINES WITH VOLTAGE SOURCE DRIVE

[75] Inventors: Patrick J. McCleer, Jackson, Mich.; Jack S. Lawler, Knoxville, Tenn.; Natarajan Narasimhamurthi, Ann Arbor, Mich.

[73] Assignee: Electric Power Research Institute, Inc., Palo Alto, Calif.

[21] Appl. No.: 69,015

[22] Filed: May 28, 1993

Related U.S. Application Data

[63] Continuation-in-part of Ser. No. 939,123, Sep. 2, 1992.

[51] Int. Cl.$^6$ .............................................. H02P 7/42
[52] U.S. Cl. ....................................... 318/719; 318/254
[58] Field of Search ............. 318/254, 138, 439, 700, 318/717, 712, 716, 718, 719, 811, 599

[56] References Cited

U.S. PATENT DOCUMENTS

| | | | |
|---|---|---|---|
| 4,511,834 | 4/1985 | Studtmann | 318/700 |
| 4,565,965 | 1/1986 | Zimmerman et al. | 318/721 |
| 4,574,225 | 3/1986 | Pershall et al. | 318/439 |
| 4,950,960 | 8/1990 | Krefta et al. | 318/254 |
| 5,144,209 | 9/1992 | Ingji et al. | 318/138 |
| 5,223,771 | 6/1993 | Chari | 318/254 |
| 5,264,775 | 11/1993 | Namuduri et al. | 318/599 |

OTHER PUBLICATIONS

Le-Huy et al., "Minimization of Torque Ripple in Brushless DC Motor Drives", IEEE Trans. on IA, vol. IA-22, No. 4, pp. 748-755 (Jul./Aug. 1986).
Murai et al., "Torque Ripple Improvement for Brushless DC Miniature Motors", IEEE Trans. on IA, vol. 25, No. 3, pp. 441-450 (May/Jun. 1989).
Berendsen et al., "Commutation Strategies for Brushless D.C. Motors: Influence on Instant Torque", Conf. Proc. of 1990 Applied Power Electronics Conf., pp. 394-400 (Mar. 1990).

*Primary Examiner*—William M. Shoop, Jr.
*Assistant Examiner*—John W. Cabeca
*Attorney, Agent, or Firm*—Leonard Bloom

[57] ABSTRACT

A method for smoothing the torque characteristics of a multi-phase PM synchronous machine by controlled driving with a conventional voltage source inverter operated in accordance with a predetermined switching sequence wherein the sum of the excitation voltages applied to the incoming phase winding and outgoing phase winding are maintained constant at a predetermined value for the duration of each commutation period. In addition, the individual excitation voltages applied to the remaining phase active windings are also held constant during the commutation period.

12 Claims, 5 Drawing Sheets

METHOD OF TORQUE NOTCH MINIMIZATION FOR QUASI SQUARE WAVE BACK EMF PERMANENT MAGNET SYNCHRONOUS MACHINES WITH VOLTAGE SOURCE DRIVE

CROSS-REFERENCE TO RELATED APPLICATION

This application is a continuation-in-part of co-pending application Ser. No. 07/939,123 filed Sep. 2, 1992.

BACKGROUND OF THE INVENTION

1. Field of the Invention

The present invention relates to permanent magnet synchronous machines and, more particularly, to a method for smoothing the torque output of quasi square wave back EMF permanent magnet (PM) synchronous machines.

2. Description of the Background

Surface mount permanent magnet (PM) AC machines have concentrated, full pitch, stator phase windings and uniformly magnetized, approximately full pitch rotor magnets.

When the excitation voltage is removed from the outgoing stator phase winding of PM-AC machine, and the excitation voltage is applied to the next incoming phase winding, there exists a difference between the rate at which the current falls in the outgoing phase winding and the rate of increase in the incoming phase winding. This differential results in a momentary torque notch (or depression) in the torque of the PM machine.

Certain applications for PM machines require smooth torque characteristics. Hence, various methods have evolved for controlling both voltage source and current source drives in order to reduce the above-described torque notch.

Several efforts have resulted in potential solutions for the torque ripple or notch problem in three phase square wave PM machines.

For instance, in Le-Huy et al., "Minimization of Torque Ripple in Brushless DC Motor Drives," IEEE Trans. on IA, Vol. IA-22, No. 4, pp. 748–755 (July/August 1986), modulation of the DC link current was proposed to compensate for back emf waveforms with less than 120° flat top value. They did not, however, consider the current rise delay in the incoming phase.

Murai et al., "Torque Ripple Improvement for Brushless DC Miniature Motors" IEEE Trans. on IA, Vol. 25, No. 3, pp. 441–450 (May/June 1989) developed pulse width modulation (PWM) methods and device conduction overlap periods to compensate for the difference in time required to turn-off the outgoing phase and fully turn-on the incoming phase. Their methods, however, resulted only in reduction of the torque ripple level, not in complete elimination of the commutation notching.

Berendsen et al., "Commutation Strategies for Brushless D.C. Motors: Influence on Instant Torque," Conf. Proc. of 1990 Applied Power Electronics Conf., pp. 394–400 (March 1990) proposed a neutral voltage feedback/compensation method to PWM regulate the machine phase currents during phase commutation and thus minimize to any degree desired (subject to PWM switching speed limitations) the commutation torque ripple. They also discussed methods useful when the back emf waveform has flat top periods of less than 120° duration. In both cases, however, an extra sensor, to sense the neutral connection voltage, is required in addition to the normal phase current sensors.

Related co-pending U.S. patent application Ser. No. 07/939,123 discloses a quasi square wave brushless DC machine having five or more phases. The five (or more) phase design of the referenced machine yields an increased efficiency and/or torque density. Hence, the design holds great commercial and industrial promise. However, the existing solutions to the torque notch problem are inapplicable, inadequate, or excessive.

It would be greatly advantageous to provide a more practical method for smoothing the torque output of quasi square wave back EMF permanent magnet (PM) synchronous machine, including the five-phase PM machine of related co-pending U.S. patent application Ser. No. 07/939,123 as well as conventional three-phase PM machines, for all applications requiring smooth torque characteristics.

SUMMARY OF THE INVENTION

It is an object of the present invention to provide a method for smoothing the torque characteristics of a multi-phase PM machine.

It is a more specific object to provide a method for smoothing torque as described above which may be employed in driving a conventional three-phase PM machine as well as a five-phase PM machine such as set forth in related co-pending U.S. patent application Ser. No. 07/939,123.

It is a specific object to smooth the torque characteristics as described above by controlled driving of the PM machine with a conventional voltage source drive operated in accordance with a predetermined switching sequence.

According to the present invention, the above-described and other objects are accomplished by providing a new method for powering a quasi square wave back EMF permanent magnet synchronous machine with a switched voltage source drive in order to minimize torque notch. The quasi square wave back EMF permanent magnet synchronous machine is preferably of the type having a rotor (or secondary in the case of a linear machine) with a plurality of permanent magnets spaced at equal intervals and a stator (or primary) having a plurality of stator windings forming an odd number N stator phases, where $N \geq 3$. The voltage source drive is of conventional construction and uses 2N switch devices arranged in N parallelly-connected switch legs for connection to an input voltage source. Each switch leg has an upper switch device coupled to each motor phase winding for positively driving said phase winding and a lower switch device coupled to each motor phase winding for negatively driving said phase winding.

The method comprises gating the switch devices of the voltage source drive according to a predetermined sequence including a plurality of successive commutation periods. Each commutation period comprises applying an excitation voltage to an incoming phase winding of said stator while removing an excitation voltage from an outgoing phase winding of said stator. Throughout the duration of each commutation period, the sum of the excitation voltages applied to the incoming phase winding and outgoing phase winding are maintained constant at a predetermined value.

The method of the invention may also include an additional step wherein the individual excitation voltages applied to the remaining phase windings (other than the incoming phase winding and outgoing phase winding) are also held constant for the duration of the respective commutation periods.

BRIEF DESCRIPTION OF THE DRAWINGS

Other objects, features, and advantages of the present invention will become more apparent from the following detailed description of preferred embodiments and certain modifications thereof when taken together with the accompanying drawings in which.

DETAILED DESCRIPTION OF THE PREFERRED EMBODIMENT

Figure 1:
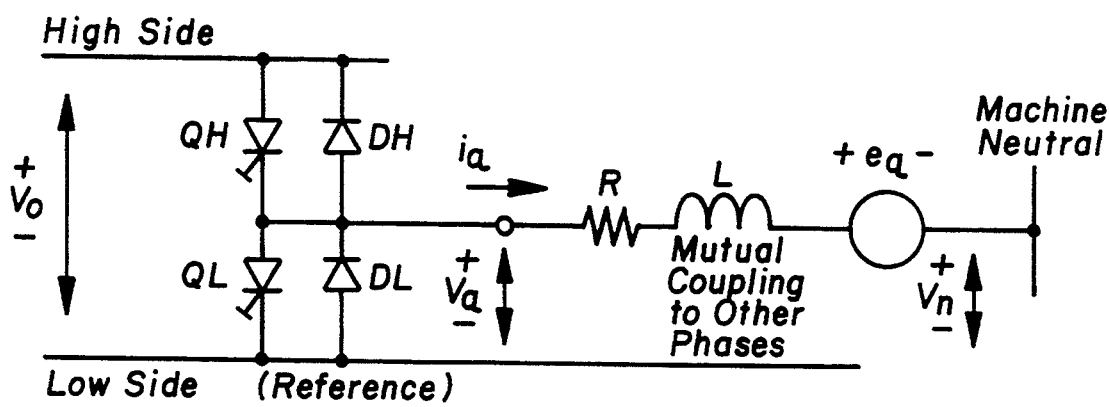
FIG. 1 is a schematic diagram representing a circuit model of one representative phase of a voltage source inverter (VSI) drive circuit for driving a quasi square wave back EMF PM synchronous machine in accordance with the method of the invention.

Permanent magnet (PM) synchronous machines may come in axial or radial embodiments both having a stator and a permanent magnet rotor, or they may come in linear embodiments having a primary and permanent magnet secondary. In either case, the rotor/secondary comprises an even number of permanent magnets equally spaced with alternating magnetic orientations around (or along) a rotor/secondary core. The angular pitch between adjacent permanent magnets of opposite orientation defines one pole pitch. The stator/primary includes a plurality of stator windings forming a number N stator phases. In accordance with the present invention, the number N can be any odd number $\geq 3$, i.e., 3, 5, 7, 9 ... etc. The method of the invention will herein be discussed in the context of a rotary machine. However, the method is equally and directly applicable to linear machines and the operation of such is considered to be within the scope of the invention.

The magnetic flux linking each stator winding in a PM AC machine emanates from two sources: 1) stator winding currents; and 2) rotor magnets. The flux linkages due to stator winding currents do not contribute to torque production if the rotor has no preferential magnetic path through its body, i.e., the rotor is not a salient structure. Hence, the invention contemplates a non-salient rotor. The preferred rotor employs true surface mounted magnets, not inset, with no iron magnet containment mechanisms. The stator winding flux linkages due to the rotor magnets are a function of the rotor angle measured with respect to some fixed point on the stator. The magnetic flux density distribution is periodic repeating over each pole pair of rotor and stator. Thus, the equivalent rotor electrical angle $\theta_e$ is related to the rotor mechanical angle $\theta$ by $\theta_e = N_p\theta/2$, where $N_p$ is the total number of magnetic poles within the machine. For a given phase stator winding (for example, $\alpha$-phase), we designate the rotor magnet source flux linkages as $\Psi_{am}(\theta_e)$. The emf $e_\alpha$ in the phase winding due to the rotation of the rotor magnets is then, by Faraday's Law $$e_\alpha = \frac{d}{dt}\Psi_{am}(\theta_e) = \frac{N_p}{2} \frac{d\theta}{dt} \Psi'_{am} \quad (1)$$

where $\Psi'_{am} \equiv \partial\theta_e$; $d\theta/dt$ is the rotor angular mechanical velocity, which will be designated $\omega$; and $d\theta_e/dt$ is the rotor angular electrical velocity, which will be designated $\omega_e$. Since this is a synchronous machine, $\omega_e$ is also the fundamental radian frequency of the drive currents in the stator windings.

The instantaneous electrical power which is converted to mechanical power $P_\alpha$ in the $\alpha$-phase stator winding is $i_\alpha e_\alpha$, where $i_\alpha$ is the winding current with reference positive direction into the winding terminal. The torque $T_\alpha$ on the structure (rotor or stator) due to $\alpha$-phase action is then simply $$T_\alpha = P_\alpha/\omega = \frac{N_p}{2} i_\alpha \Psi'_{am} \quad (2)$$

The total instantaneous torque for the machine is the summation of the contributions from each phase $$T = \frac{N_p}{2} \sum_\alpha^N i_\alpha \Psi'_{am}. \quad (3)$$

Each phase of the machine and drive is represented by the circuit model shown in FIG. 1. The half-bridge voltage source drive is fed by a DC bus of constant bus voltage $V_o$. High and low side switching devices QH and QL are provided, and these may be any suitable gated solid-state switching elements such as bi-polar junction transistors, insulated-gate bi-polar transistors, field effect transistors, or gate turn-off thyristors. The high and low side switching devices QH and QL are each shunted by anti-parallel wheeling diodes DH and DL, respectively. These serve as wheeling paths for inductive currents in the phase winding when either QH or QL is turned-off while still conducting current. The resistance R is the total resistance of the $\alpha$-phase winding, L is the self inductance of the winding, $e_\alpha$ is the back emf induced in the winding due to rotation of the rotor magnets, and $v_n$ is the instantaneous value of the voltage of the neutral connection with respect to the low side of the DC bus. The flux linkages within the a-phase winding due to stator currents are given by $$\Psi_{as} = Li_a + \sum_{\beta} M_{a\beta} i_\beta \qquad (4)$$

where the summation is taken over the remaining phases within the machine; and $M_{\alpha\beta}$ is the mutual inductance between $\alpha$ and $\beta$ windings. As stated previously, the reluctances of the flux paths through the rotor structure are assumed to be independent of rotor position. Thus, $M_{\alpha,\beta}$ is a constant, and not a function of $\theta$.

For conventional three phase machines with concentrated windings the inductances of the windings, both self and mutual, can be expressed in matrix form as follows:

$$\begin{bmatrix} L_o + 3M & -M & -M \\ -M & L_o + 3M & -M \\ -M & -M & L_o + 3M \end{bmatrix} \qquad (5)$$

where $L_o$ is the leakage inductance of any one winding, due to flux produced by the winding which does not couple to any other winding; and M is the magnitude of the mutual inductance between any two windings, due to flux which crosses the air gaps and passes through at least a portion of the rotor structure. The self inductance of any one winding includes a term of three times the magnitude of the mutual values. This factor of three is due to the concentrated nature of the windings.

The applied voltage $v_a$ to the reference terminal of the a-phase winding, dependent on the state of QH and QL or, if both off, on the direction of $i_a$ (if non-zero), is given by $$v_a = (R + Lp) i_a + \sum_{\beta} M_{a\beta} p i_\beta + \omega_e \Psi'_{am} + v_n \qquad (6)$$

where p is the operator d/dt, and $\omega_e \Psi'_{am} = e_a$ the winding back emf. In general, equation (6) is non-linear since the rotor speed, and thus $\omega_e$ is a variable quantity. In most cases, however, we can use the quasi-static approximation and assume that electrical quantities change much faster than mechanical quantities, and thus, treat the rotor speed as a constant over the short time periods in which we solve for electrical waveform variations. In this case, the back emf $e_a$ and $\Psi'_{am}$ both have the same shape over any given time interval.

Figure 2:
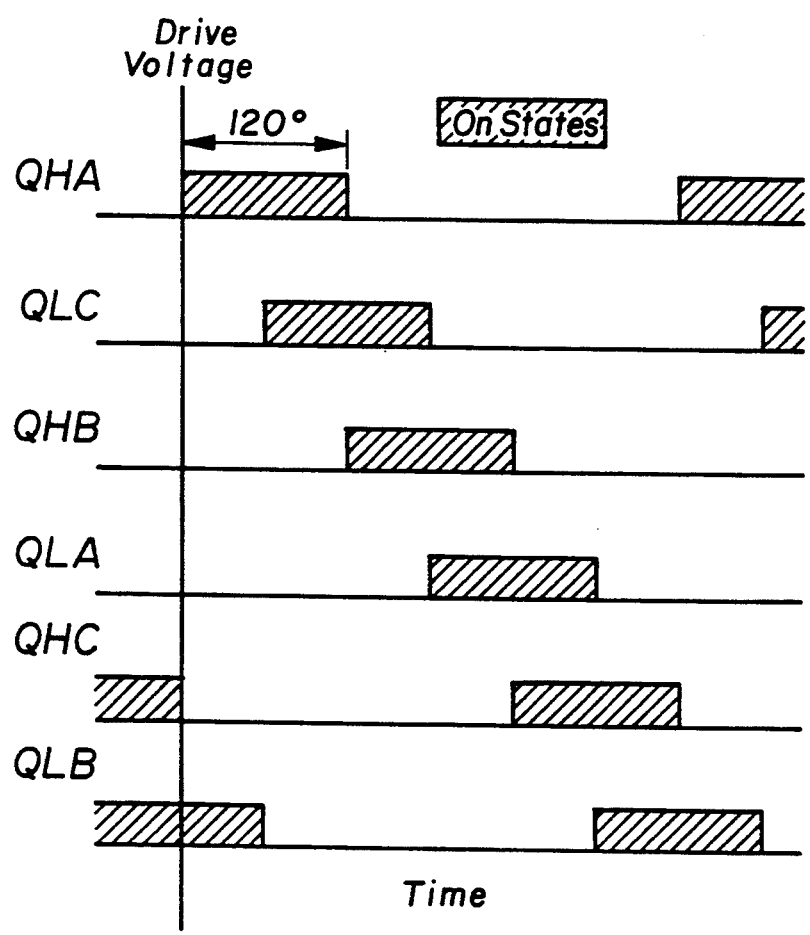
FIG. 2 is a timing diagram showing an exemplary switching sequence for a three-phase VSI drive circuit based on FIG. 1 for the standard method of driving a three-phase back EMF PM synchronous machine without torque notch minimization control.
Figure 3:
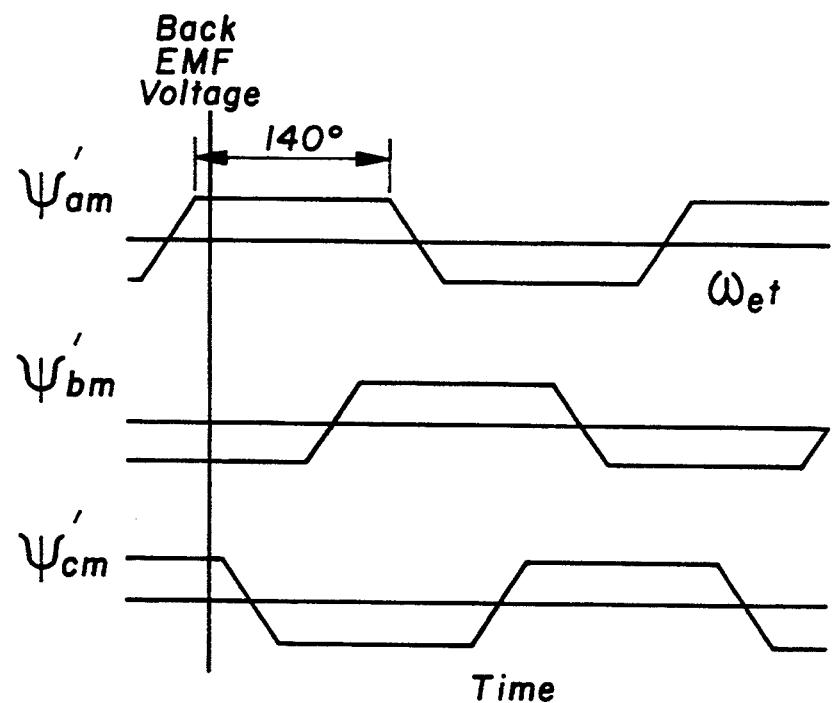
FIG. 3 is an exemplary graphical illustration of the shape of the back EMF waveforms for a three-phase quasi square wave back EMF PM machine.

In a conventional three phase machine, three high side switching devices QHA, QHB, and QHC and three low side switching devices QLA, QLB, and QLC, respectively, correspond to each of the three phases A, B, and C, and the switch devices are switched according to a sequence such as shown in FIG. 2. The sequential switching states represent a step-like drive (i.e., no PWM control) with a bus voltage $V_o$ that exceeds the peak line-to-line back emf of the machine at a given operating speed. The earmark characteristics of conventional quasi square wave back EMF PM synchronous machines are apparent in the back EMF voltage shape waveforms of FIG. 3. Namely, they exhibit a back EMF voltage waveform for each phase defined by trapezoidal cycles having plateaus of constant back EMF voltage levels. Dependent on machine design, the constant flat top portion can exceed the idealized 120° value for the three-phase drive of FIG. 2. In FIG. 3, the angular extent of the flat top portion of the waveform is approximately 140°, or 20° longer than needed for the idealized 120° drive condition.

For purposes of explanation, we will consider the instantaneous torque production in one exemplary commutation interval during which high side switch QHA is turned off in the a-phase, and the high side switch QHB is turned on to drive the b-phase. Phase-c remains connected to the low side bus terminal throughout this interval via QLC. Phase-b is designated the incoming phase, and phase-a is designated the outgoing phase. The duration of this commutation process is assumed to be short enough such that a-phase current $i_a$ falls to zero before $\Psi'_{am}$ starts to fall from its flat top peak value of $\Psi'_{om}$.

The neutral connection voltage $v_n$ can be eliminated from the three circuit equations derived from equation (6) by use of the three wire restriction $i_a + i_b + i_c = 0$. Use of this condition results in the following two independent equations, valid for any a-phase and b-phase drive and back emf variation:

$$v_a + v_b = 3(R + L_3 p)(i_a + i_b) + \omega_e(\Psi'_{am} + \Psi'_{bm} 2\Psi'_{om}) \qquad (7)$$

and $$v_a - v_b = (R + L_e p)(i_a - i_b) + \omega_e(\Psi'_{am} - \Psi'_{bm}) \qquad (8)$$

where, during this commutation interval, $v_c = 0$, and $\Psi'_{cm} = -\Psi'_{om}$. Inductance $L_3 = L_o + 4M$, where $L_o$ and M are defined in equation (5) above. For the specific case of step-like drive $v_b = V_o$ and $v_a = 0$; and for the specified case of commutation completion during the flat top periods of emf variation, $\Psi'_{am} = \Psi'_{bm} = \Psi'_{om}$. We further assume that rotor speed $\omega_e$ does not vary appreciably over the commutation interval, so the phase winding back emf $E_o = \omega_e \Psi'_{om}$ is a constant. Equations (7) and (8) can now be easily solved for the time variation of $i_a$ and $i_b$.

Figure 4:
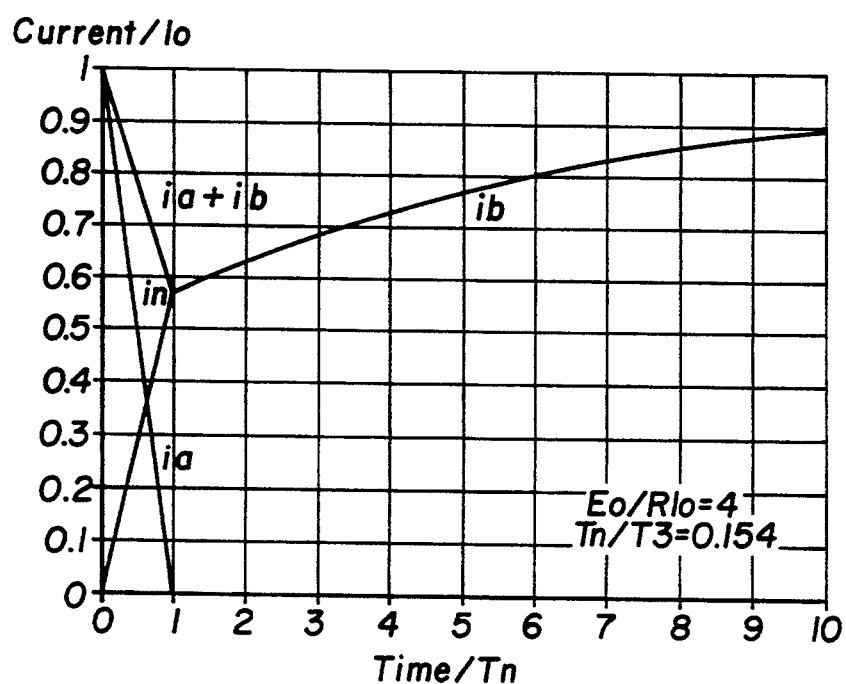
FIG. 4 is a graphical illustration of the active phase winding currents over time for drive control of a three-phase PM machine according to the switching sequence of FIG. 2.

FIG. 4 is a graph of the phase currents $i_a$ and $i_b$ in the three-phase example. Typical solutions to equations (7) and (8) are shown, where the quantities $i_n$ and $t_n$ are determined by $$i_n/I_o = (2E_o + 4RI_o)/(4E_o + 5RI_o) \qquad (9)$$

and $$1 - e^{-t_n/\tau_3} = 3RI_o/(4E_o + 5RI_o) \qquad (10)$$

where $I_o$ is the phase winding current immediately prior to commutation and $\tau_3 = L_3/R$. Time $t_n$ is the time required for a-phase to turn-off, i.e., the time required for $i_a$ to fall from $I_o$ to zero. In general, this time $t_n$ is shorter, usually much shorter than the time required for b-phase current to rise from its a-phase turn-off time value $i_n$ to the steady-state resistance and voltage determined value $I_o = (V_o - 2E_o)/2R$. The machine torque during the commutation interval, from (3) above, is simply $$T = N_p \Psi'_{om}(i_a + i_b). \qquad (11)$$

Thus, the torque notch has the same shape as the $i_a + i_b$ curve for $0 \leq t \leq t_n$ and the $i_b$ curve for $t > t_n$ in FIG. 4. As given by (9) the minimum value of $i_a + i_b = i_n$ determines the minimum value of the torque $T_n$ at the notch point. Thus, equation (9) also gives $T_n/T_o$ where $T_o$ is the nominal torque $N_p\Psi'_{om}I_o$. The torque notch is seen to approach 80% at low speeds where the winding resistive drop $RI_o$ is greater than the back emf $E_o$ and fall to near 50% at high speeds where the back emf $E_o$ is greater than the resistive drop $RI_o$.

The key constraint for torque notch compensation according to the present invention is clearer in view of equation (11) above. The current sum $i_a+i_b$ is preferably kept constant throughout the commutation period. However, the variation of $i_a+i_b$ is governed by equation (7) above. Hence, we can instead constrain the applied voltage sum $v_a+v_b$ to its pre-commutation interval value. This way, $i_a+i_b$ should not change during commutation. Just prior to commutation a-phase drive QHA is on, thus, $v_a=V_o-2(E_o+RI_o)$; and b-phase is floating (i.e., QHB and QLB are both off and $i_b=0$) so $v_b=2E_o+RI_o$. Substitution of these values into equation (7) clearly shows that if the sum of the incoming and outgoing terminal voltages $v_a+v_b$ sums to $4E_o+3RI_o$, then $p(i_a+i_b)=0$ throughout the commutation and the machine torque remains constant.

The method of the present invention may be generalized as maintaining the sum of the excitation voltages applied to the incoming phase winding and outgoing phase winding constant at a predetermined value for the duration of each commutation period.

In practice, this means that the magnitude of the terminal voltage $v_b$ of the incoming phase b be boosted by an amount $\Delta v$ above its nominal on-value while the voltage $v_a$ of the outgoing phase is reduced below its nominal on-value.

Figure 5:
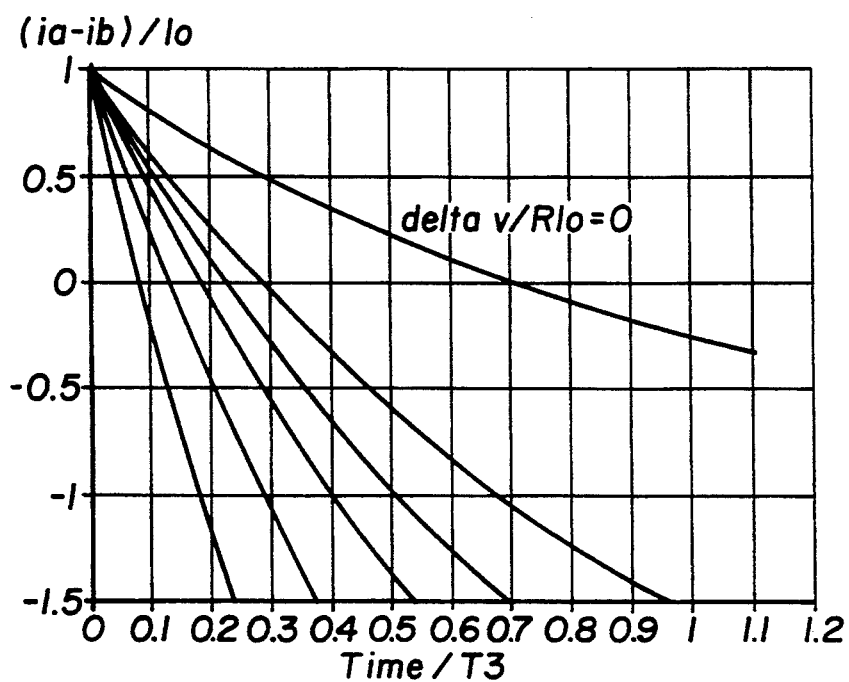
FIG. 5 is a graphical illustration of the difference between the active phase winding currents (turn-on and turn-off phases) over time within a commutation period for torque notch minimization drive control for a three-phase PM machine.
Figure 6:
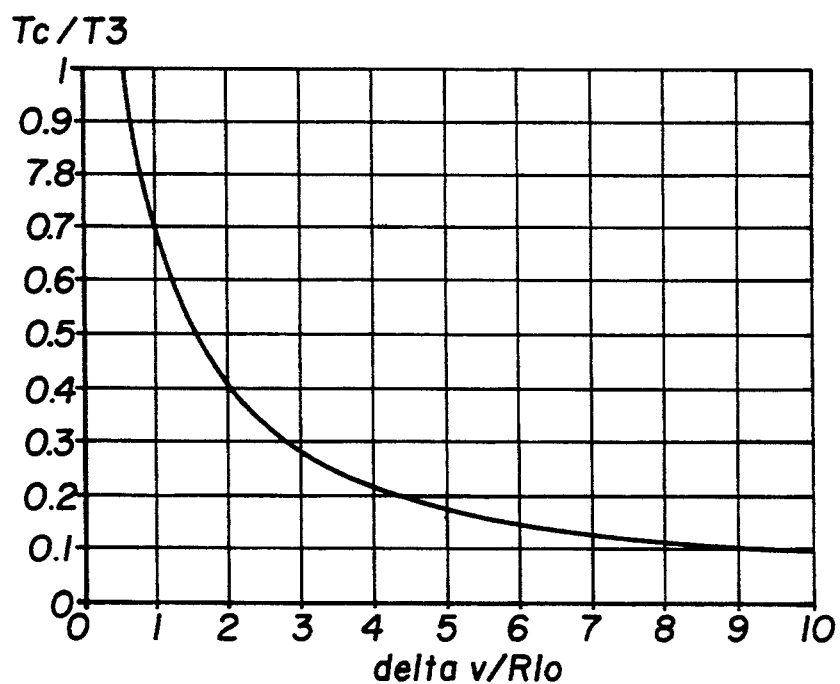
FIG. 6 is a graphical illustration of the time ($t_c/\tau_3$) required for commutation (as a function of $\Delta v/RI_o$) for torque notch minimization drive control of the three-phase PM machine.

The extent of the commutation interval is determined by equation (8). Let $v_b$ be the independent or controlling quantity. Further, let $v_b \equiv V_o+\Delta v$. Thus, by the restriction on the sum $v_a+v_b$, $v_a$ becomes equal to $V_o-RI_o-\Delta v$. The solution to equation (8) now becomes $$i_a-i_b=I_o-(I_{ox}+I_o)(1-e^{-t/\tau_3}), \qquad (12)$$

where $I_{ox}=2(RI_o+\Delta v)/R$. This solution is sketched in FIG. 5 for different values of excess $v_b$ drive $\Delta v$. The commutation interval is over when $i_a-i_b$ falls to the value $-I_o$. At this time, QHA is safely switched off without resultant wheeling current through DLA since $i_a$ is now zero. The time required for complete commutation, $t_c$, is seen from FIG. 5 to be a monotonically falling function of the incoming phase overdrive voltage $\Delta v$. A plot of $t_c/\tau_3$ is given in FIG. 6 as a function of $\Delta v/RI_o$.

One must choose a sufficient value of $\Delta v$ to insure that the angle $\omega_e t_c$ is less than the remaining angular extent of the flat top portion of $\Psi'_{am}$, measured from the time of commutation start.

If the net or average DC bus voltage $V_o$ is attained by PWM of the drive switching devices then the needed values of $v_a$ and $v_b$ during commutation can be attained by modified pulse width modulation (PWM) of QHA and QHB respectively, if the actual DC bus voltage $V_{om}$ is greater than $V_o+\Delta v$. If the DC bus voltage $V_o$ is not determined by PWM of the drive switching devices, then the $\Delta v$ boost to the incoming phase must be supplied by additional circuitry. However, the most common method of drive control (i.e., regulation of $I_o$) is PWM from a fixed voltage bus. Thus, modified PWM control of QHA and QHB during commutation is easily implemented with no additional hardware. An upper speed limit on this compensation method will be reached when the PWM determined value of $V_o$ is too close to $V_{om}$ to achieve the needed value $\Delta v$.

Figure 7:
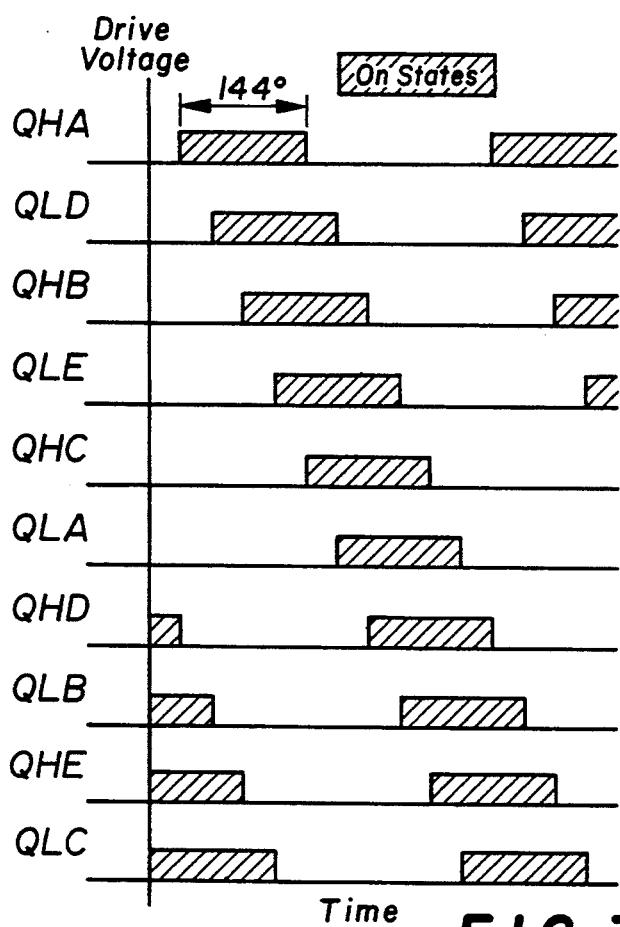
FIG. 7 is a timing diagram showing an exemplary switching sequence for a five-phase VSI drive circuit based on FIG. 1 for the standard method of driving a five-phase back EMF PM synchronous machine without torque notch minimization control.

Torque notch compensation can also be achieved in a five-phase machine in accordance with the method of the present invention. In an exemplary five phase machine as set forth in co-pending U.S. patent application Ser. No. 07/939,123 with concentrated windings, the inductances of the windings (both self and mutual) can be expressed in matrix form as follows:

$$\begin{bmatrix} L_o+5M & M & -3M & -3M & M \\ M & L_o+5M & M & -3M & -3M \\ -3M & M & L_o+5M & M & -3M \\ -3M & -3M & M & L_o+5M & M \\ M & -3M & -3M & M & L_o+5M \end{bmatrix} \qquad (13)$$

where, as in the above-described three phase case, $L_o$ is the leakage inductance of any one winding and M is the magnitude of the mutual inductance between nearest neighbor phase windings. The factors of three and five in matrix (13) are due to the concentrated nature of the windings. For standard five phase drive, the high side switching devices QHA, QHB, QHC, QHD, and QHE and the low side switching devices QLA, QLB, QLC, QLD, and QLE, respectively, corresponding to each of the five phases A, B, C, D, and E are switched according to a sequence such as shown in FIG. 7. Again, the machine exhibits a back EMF voltage waveform for each phase defined by trapezoidal cycles having plateaus of constant back EMF voltage levels.

Five-phase machines can be designed such that the angular extent (in electrical degrees) of the constant back EMF voltage level can be established within a range of between 120° to nearly 180°. The particular back EMF range depends upon the size and placement of the permanent magnets in the rotor and the construction of the stator windings.

Figure 8:
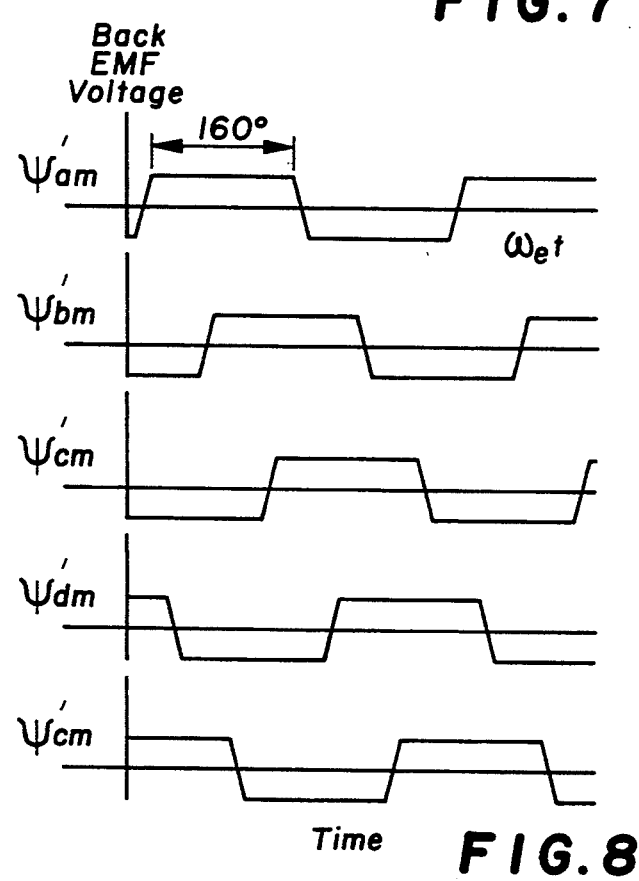
FIG. 8 is an exemplary graphical illustration of the shape of the back EMF waveforms for the five-phase quasi square wave back EMF PM machine.

Idealized five phase rate of change of stator winding flux linkages due to the rotor magnets and accompanying step like drive conduction periods for the 10-device drive circuit are given in FIGS. 7 and 8. In a five phase machine with voltage source drive, each phase winding is typically excited over a range of only 144° as shown. For the exemplary 160° trapezoidal plateau shown in FIG. 8, there is approximately a 16° overlapping period of constant back EMF during which the phase winding currents can be commutated under torque notch minimization control. As in the above-described three-phase method, the control scheme of the present invention is implemented during this period of overlap. For purposes of explanation, we will discuss the exemplary commutation period of time required to drive a-phase current to zero and to drive c-phase current to the steady state value $I_o$. Throughout the commutation period, phase-b remains connected to the high side bus through QHB, and phases d and e remain connected to the low side through QLD and QLE, respectively.

The five circuit equations derived from equation (6) can be reduced to four independent equations by eliminating the neutral connection voltage by use of the five wire restriction $i_a+i_b+i_c+i_d+i_e=0$. We also use $\Psi'_{am}=\Psi'_{bm}=\Psi'_{cm}=-\Psi'_{dm}=-\Psi'_{em}=\Psi'_{om}\equiv E_o/\omega_e$, and $v_d=v_e=0$. The resultant four equations are given by $$[3(v_a+v_c)-2v_b-8E_o]/5=(R+L_{5m}p)(i_a+i_c)+M_5pi_b \quad (14)$$

$$[4v_b-(v_a+v_c)-4E_o]/5=M_5p(i_a+i_c)+(R+L_{5n}p)i_b \quad (15)$$

$$v_a-v_c=(R+L_{5n}p)(i_a-i_c)-M_5p(i_d-i_e) \quad (16)$$

and $$0=-M_5p(i_a-i_c)+(R+L_{5m}p)(i_d-i_e) \quad (17)$$

where $L_{5m}=L_o+4M$, $L_{5n}=L_o+8M$, $M_5=4M$, with $L_o$ and M defined in (13).

Note the couplings in these equations. Equations (14) and (15) stand as an independent set and (16) and (17) stand as an independent set. The set of (14) and (15) correspond to (7) in the three phase case and the set (16) and (17) correspond to (8) in the three phase case. The instantaneous torque in a five phase machine at the commutation interval of interest, with the five wire restriction $i_a+i_b+i_c+i_d+i_e=0$, is (from equation (3))

$$T=N_p\Psi'_{om}(i_a+i_b+i_c). \quad (18)$$

Thus, to maintain constant torque the high side connected terminal currents $i_a$, $i_b$, and $i_c$ must all sum to a constant. Following the three phase case, we see that this can be accomplished if constant solutions to (14) and (15) are possible. Again from the three phase case, we see that this is possible if the prior to commutation set of drive voltages $v_a+v_c$ and $v_b$ are maintained throughout commutation. That is, prior to commutation $v_a=V_o=2(E_o+RI_o)$, $v_b=V_o$, $v_c=2E_0+RI_o$. Thus, we must only maintain $$v_a+v_c=4E_o+3RI_o \quad (19)$$

and $$v_b=V_o=2(E_o+RI_o). \quad (20)$$

Note that condition (19) on the sum of the drive voltages for the incoming and the outgoing phases is exactly the same as that required in the three phase case. Substituting conditions (19) and (20) into (14) and (15) gives the desired $p(i_a+i_c)=pi_b=0$ throughout commutation.

The length of the commutation interval is determined by (16) and (17). As in the three phase case, we let the drive voltage for the incoming phase be the controlling or independent variable. We set $v_c=V_o+\Delta v$. From (19) we then have $v_a=V_o-RI_o-\Delta v$ (as in the three phase case). Subbing these values into (16) and (17) we obtain two coupled first order differential equations for the difference current sets $i_a-i_c$ and $i_d-i_e$. These equations can be solved in closed form. The solution for $i_a-i_c$ during commutation is given by $$(i_a-i_c)/I_o = K_1e^{-\delta_1 t} + K_2e^{-\delta_2 t} - \left(1+\frac{2\Delta v}{RI_o}\right). \quad (21)$$

The expressions for the constants $K_1$, $K_2$, $\delta_1$, and $\delta_2$ are quite complicated. But for the limiting case of $5M>>L_o$, that is the leakage inductance component of each stator phase winding can be neglected, we have $$\delta_{1,2} = \frac{R}{8M}(3 \mp \sqrt{5}), \quad (22)$$

$$K_1 = 2\left(1+\frac{\Delta V}{RI_o}\right)\frac{\sqrt{5}+1}{2\sqrt{5}}, \quad (23)$$

and $$K_2 = 2\left(1+\frac{\Delta V}{RI_o}\right)\frac{\sqrt{5}-1}{2\sqrt{5}}. \quad (24)$$

Figure 9:
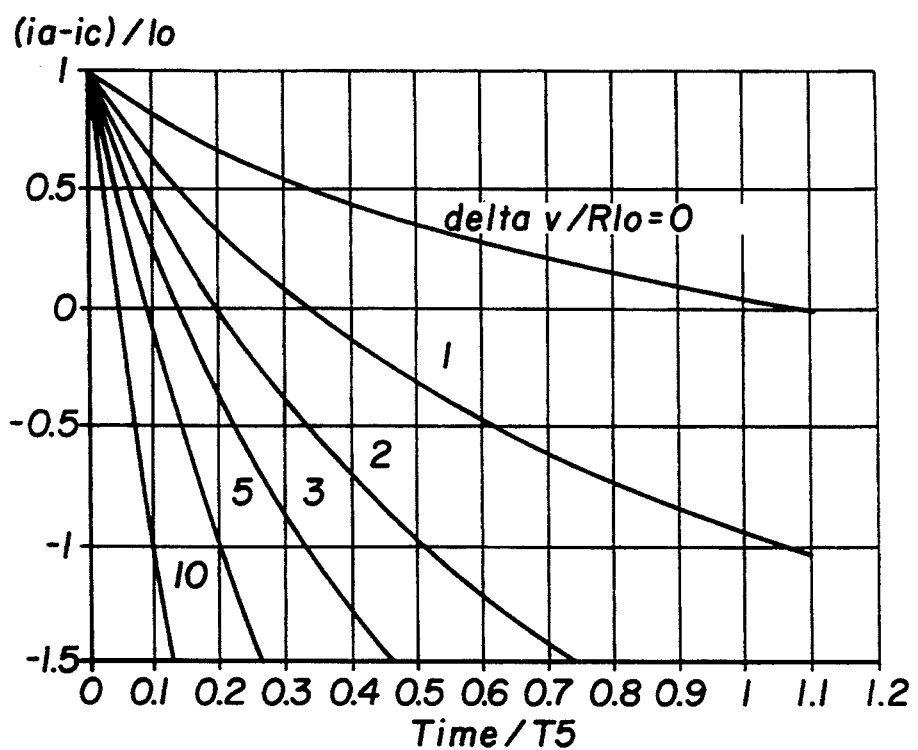
FIG. 9 is a graphical illustration of the difference between phase currents in the active (turn-on and turn-off) phases within a commutation period for torque notch minimization drive control of a five-phase square wave PM AC machine.

Solution (21) is plotted in FIG. 9 for the constants of (22)-(24) as a function of time normalized to $\tau_5=4M/R$ and for different values of incoming phase overdrive voltage. Note the similarity to the corresponding three phase solution plotted in FIG. 5. The commutation interval ceases when $i_a$ reaches zero and $i_c$ simultaneously reaches $I_o$. The compensation control is then switched off, that is QHA is turned-off and $v_c$ is lowered to $V_o$, the nominal steady-state bus voltage needed to maintain $I_o$ in each of the active phase windings.

A 10 hp 3600 rpm 4-pole, five phase machine is presently under development, and measured values for this prototype are: $R=0.43\Omega$ and $5M=4.4$ mH. Rated phase current is 14A and rated DC bus voltage is 330 VDC. Thus, $\tau_5=4M/R=8.2$ msec. At one quarter speed operation, 30 Hz drive, assuming a 160° flat top square wave back emf, We have a maximum time for compensation of $[(160-144)/180]/(2\times30)=1.5$ msec, so that $t_c/\tau_5=1.5/8.2=0.18$. From FIG. 9, we see that this level of compensation requires a $\Delta v/RI_o$ near six or seven. Assuming the higher value and operation at rated torque (i.e., rated $I_o$) would then require $7\times6=42$ volts. At one quarter speed and rated torque the nominal, steady-state bus voltage $V_o$ would be 92 VDC; thus, the ability to set $v_c=V_o+\Delta v=134$ V and $v_a=V_o-RI_o-\Delta v=44$ V is assured.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

We claim:

1. A method for powering a quasi square wave back EMF permanent magnet synchronous machine with a voltage source drive in order to minimize torque notch, the quasi square wave back EMF permanent magnet synchronous machine having a rotor with a plurality of permanent magnets spaced at equal angular intervals, and a stator having a plurality of stator windings forming an odd number N stator phases where $N\geq 3$, and the voltage source drive having 2N switch devices arranged in N parallely-connected switch legs for connection to an input voltage source, each switch leg having a high side switch device coupled to one of said motor phase windings for driving said phase winding by a drive voltage respective to said phase winding according to a first polarity, and a low side switch device coupled to the one motor phase winding for driving said phase winding by a drive voltage respective to said phase winding according to a second polarity, the powering method comprising the steps of:

gating the switch devices of said voltage source drive according to a predetermined sequence of successive switch periods, each switch period including a commutation period comprising applying an excitation voltage to an incoming phase winding of said stator, said excitation voltage being above the drive voltage respective to said incoming phase winding, while reducing an excitation voltage to an outgoing phase winding of said stator, said excitation voltage being below the drive voltage respective to said outgoing phase winding, thereby maintaining the sum of the excitation voltages applied to the incoming phase winding and outgoing phase winding constant at a predetermined value for the duration of each commutation period.

2. The method for minimizing torque notch according to claim 1 wherein said step of maintaining the sum of the excitation voltages applied to the incoming phase winding and outgoing phase winding constant further comprises maintaining a voltage applied to remaining active phase windings constant for the duration of each commutation period.

3. A method for powering a quasi square wave back EMF permanent magnet synchronous machine with a voltage source drive in order to minimize torque notch, the quasi square wave back EMF permanent magnet synchronous machine having a rotor with a plurality of permanent magnets spaced at equal angular intervals, and a stator having a plurality of stator windings forming an odd number N stator phases where N≧3, and the voltage source drive having 2N switch devices arranged in N parallely-connected switch legs for connection to an input voltage source, each switch leg having a high side switch device coupled to one of said motor phase windings for driving said phase winding according to a first polarity, and a low side switch device coupled to the one motor phase winding for driving said phase winding according to a second polarity, the powering method comprising the steps of:

gating the switch devices of said voltage source drive according to a predetermined sequence of successive switch periods, each switch period including a commutation period comprising applying an excitation voltage to an incoming phase winding of said stator while removing an excitation voltage from an outgoing phase winding of said stator; and maintaining the sum of the excitation voltages applied to the incoming phase winding and outgoing phase winding constant at a predetermined value for the duration of each commutation period, wherein said step of maintaining the sum of the excitation voltages applied to the incoming phase winding and outgoing phase windings constant further comprises holding said sum constant at a level equal to four times a back emf $E_o$ than in said machine plus three times a voltage drop $RI_o$ within said outgoing phase winding prior to said commutation period.

4. The method for minimizing torque notch according to claim 2 wherein said motor is a three-phase motor having one incoming phase winding, one outgoing phase winding, and one additional active phase winding at each commutation period.

5. The method for minimizing torque notch according to claim 2 wherein said motor is a five-phase motor having one incoming phase winding, one outgoing phase winding, and three additional active phase windings at each commutation period.

6. The method for minimizing torque notch according to claim 1 wherein the 2N switch devices of said voltage source drive are switched by pulse width modulation (PWM).

7. A method for powering a quasi square wave back EMF linear PM machine with a voltage source drive in order to minimize torque notch, the linear PM synchronous machine having a secondary with a plurality of permanent magnets spaced at equal lengthwise intervals, and a primary having a plurality of primary windings forming an odd number N primary phases, where N≧3, and the voltage source drive having 2N switch devices arranged in N parallely-connected switch legs for connection to an input voltage source, each switch leg having a high side switch device coupled to one of said motor phase windings for driving said phase winding by a drive voltage respective to said phase winding according to a first polarity, and a low side switch device coupled to the one motor phase winding for driving said phase winding by a drive voltage respective to said phase winding according to a second polarity, the powering method comprising the steps of:

gating the switch devices of said voltage source drive according to a predetermined sequence of successive switch periods, each switch period including a commutation period comprising applying an excitation voltage to an incoming phase winding of said primary, said excitation voltage being above the drive voltage respective to said incoming phase winding, while reducing an excitation voltage to an outgoing phase winding of said primary, said excitation voltage being below the drive voltage respective to said outgoing phase winding, thereby maintaining the sum of the excitation voltages applied to the incoming phase winding and outgoing phase winding constant at a predetermined value for the duration of each commutation period.

8. The method for minimizing torque notch according to claim 7 wherein said step of maintaining the sum of the excitation voltages applied to the incoming phase winding and outgoing phase winding constant further comprises maintaining excitation voltages applied to remaining active phase windings constant for the duration of each commutation period.

9. A method for powering a quasi square wave back EMF linear PM machine with a voltage source drive in order to minimize torque notch, the linear PM synchronous machine having a secondary with a plurality of permanent magnets spaced at equal lengthwise intervals, and a primary having a plurality of primary windings forming an odd number N primary phases, where N≧3, and the voltage source drive having 2N switch devices arranged in N parallely-connected switch legs for connection to an input voltage source, each switch leg having a high side switch device coupled to one of said motor phase windings for driving said phase winding according to a first polarity, and a low side switch device coupled to the one motor phase winding for driving said phase winding according to a second polarity, the powering method comprising the steps of:

gating the switch devices of said voltage source drive according to a predetermined sequence of successive switch periods, each switch period including a commutation period comprising applying an excitation voltage to an incoming phase winding of said primary while removing an excitation voltage from an outgoing phase winding of said primary; and maintaining the sum of the excitation voltages applied to the incoming phase winding and outgoing phase winding constant at a predetermined value for the duration of each commutation period, wherein said step of maintaining the sum of the excitation voltages applied to the incoming phase winding and outgoing phase windings constant further comprises holding said sum constant at a level equal to four times a back emf $E_o$ than in said machine plus three times a voltage drop $RI_o$ within said outgoing phase winding prior to said commutation period.

10. The method for minimizing torque notch according to claim 8 wherein said motor is a three-phase motor having one incoming phase winding, one outgoing phase winding, and one additional active phase winding at each commutation period.

11. The method for minimizing torque notch according to claim 8 wherein said motor is a five-phase motor having one incoming phase winding, one outgoing phase winding, and three additional active phase windings at each commutation period.

12. The method for minimizing torque notch according to claim 7 wherein the 2N switch devices of said voltage source drive are switched by pulse width modulation (PWM).

* * * * *